No. 791,663. PATENTED JUNE 6, 1905.
T. S. WILES.
MANGLE.
APPLICATION FILED JULY 31, 1903.

WITNESSES:
Wm H Doyle
Alfred T Gage.

INVENTOR
Thomas S Wiles
By E B Stocking
Attorney

No. 791,663. Patented June 6, 1905.

UNITED STATES PATENT OFFICE.

THOMAS S. WILES, OF ALBANY, NEW YORK.

MANGLE.

SPECIFICATION forming part of Letters Patent No. 791,663, dated June 6, 1905.

Application filed July 31, 1903. Serial No. 167,750.

*To all whom it may concern:*

Be it known that I, THOMAS S. WILES, a citizen of the United States, residing at Albany, in the county of Albany, State of New York, have invented certain new and useful Improvements in Mangles, of which the following is a specification, reference being had therein to the accompanying drawings.

This invention relates to mangles or ironing-machines of that class which involves the employment of stationary ironing elements adapted to be heated by steam or gas or any convenient means and coöperating clothed rolls, these members being arranged so as to progressively iron and to pass, carry, or feed the articles being ironed from one to another of the series of pairs in which the members are arranged.

It is proper to state that the machine herein disclosed is intended primarily, though not exclusively, for mangling or ironing large pieces, such as table and bed linen, which require a machine with largely-extended ironing-surfaces both longitudinally and transversely and provision of means for quickly separating the clothed from the heated members for the prevention of injury to the clothing of the rollers or for other purposes during any suspension in the operation of the machine; and it is one of the objects of the invention to provide such mechanical devices for so separating said members as may be easily operated by one adult person of average strength.

Another object of the invention is to provide a compactly-arranged duplicated series of pairs of such heated and clothed members and to so dispose said duplicated series that the goods may thereby be ironed successively on both sides in one passage therethrough.

A further object of the invention is, without making the machine of an inconvenient length, to materially increase its capacity by providing means for passing the goods to be ironed over and in close contact with so large an extent of heated surfaces opposed by so small an extent of absorbent clothed surfaces that the evaporation of moisture from the goods shall be very rapid and the efficiency of the machine thereby correspondingly increased. The conformation of the heated surfaces as disclosed herein and their disposition in a series of overlapping planes over which, successively, the goods pass in their zigzag path through the machine, the primary object of which arrangement is the ironing of the goods successively upon opposite sides, serve also to provide within the limits of a very compact machine the desired large extension of heated surfaces with ample open spaces between the clothed rolls, which permit rapid evaporation with consequent increase in capacity of the machine.

Other objects and advantages of the invention will be hereinafter set forth, and the novel features thereof will be particularly pointed out in the claims.

Referring to the drawings, Fig. 3 is an inside elevation of the left main frame with an inside elevation of the lifting mechanism, shafts and cross-ties being in section. Fig. 3ª is a vertical section on the line 3 3 of Fig. 3 with parts broken away. Fig. 4ª is a plan of the end portion of the lower series of ironing members and of the gearing on the left side of the machine. Fig. 7 is a cross-section, and Fig. 8 is a longitudinal central section, of a portion of one of the steam-chests.

Like figures of reference refer to like parts in all the figures of the drawings.

1 is a suitable framework having tie-rods 1ª, which may be of any desired design so long as it is adapted to support the stationary and moving parts of the machine.

2 2 2 (see Figs. 1, 4, 4ª, 6, 7, and 8) represent steam-heated chests, each having a concave upper finished ironing-surface 3 and having the usual steam inlets and outlets (not shown) for the entrance and exit of steam and for the discharge of water of condensation when steam is used as the heating agent, and each chest is of such contour on its upper portion 4 that when placed adjacent to another a continuous bridge or feeding-surface 4 4 is provided between the chests in a series thereof. The steam-chests 2 shown in the upper series have finished surfaces only at their tops, while the steam-chests 2 shown in the lower series have in addition to the features above described with relation to the chests of the upper series finished under surfaces 5, extending entirely along said chests, whereby the same are adapted to perform the function of ironing in connection with any suitable coöperating member or members. Each of the steam-chests is provided at its end with a bracket or brackets 6, which are simply lugs projecting longitudinally from the ends of each chest, so as to adapt them to be supported by suitable brackets 7, Fig. 4, formed on each inner surface of the frame 1. While it is apparent that the two series of steam-chests might be arranged in parallel horizontal planes within the frame 1, it is preferred to incline them in opposite directions, as shown, whereby the delivering end of the first series is brought nearer to the receiving end of the second series, and the transit of the goods from one series to the other is thereby shortened and facilitated, a bridge 8, Fig. 1, or any other equivalent means being provided for such transit. When certain classes of goods are to be ironed which, owing to their light texture or to the presence of starch, are inclined to adhere to the clothed rolls of the upper series, a provision to prevent such adhesion may be made of a series of endless tapes or cords 9, interposed between the clothed rollers of the upper series and the goods as the latter are passing between said rolls and the heated metal chests, the tapes or cords passing down with the goods over the bridge 8, and, after delivering the goods between the first steam-chest and the first clothed roll of the second series, returning over the small rollers or spools 31 and over the tops of the first series of clothed rolls to the receiving end of the first series. The tendency of the goods to adhere to the clothed rolls generally ceases after the amount of ironing and drying, which would be effected by the operation of the first series, and the impression imprinted on the goods by the tapes or strings is obliterated by the ironing the goods receive in the second series. Tapes or cords are preferred to an apron for this purpose because they do not retard the drying of the goods as an apron would.

Figure 1:
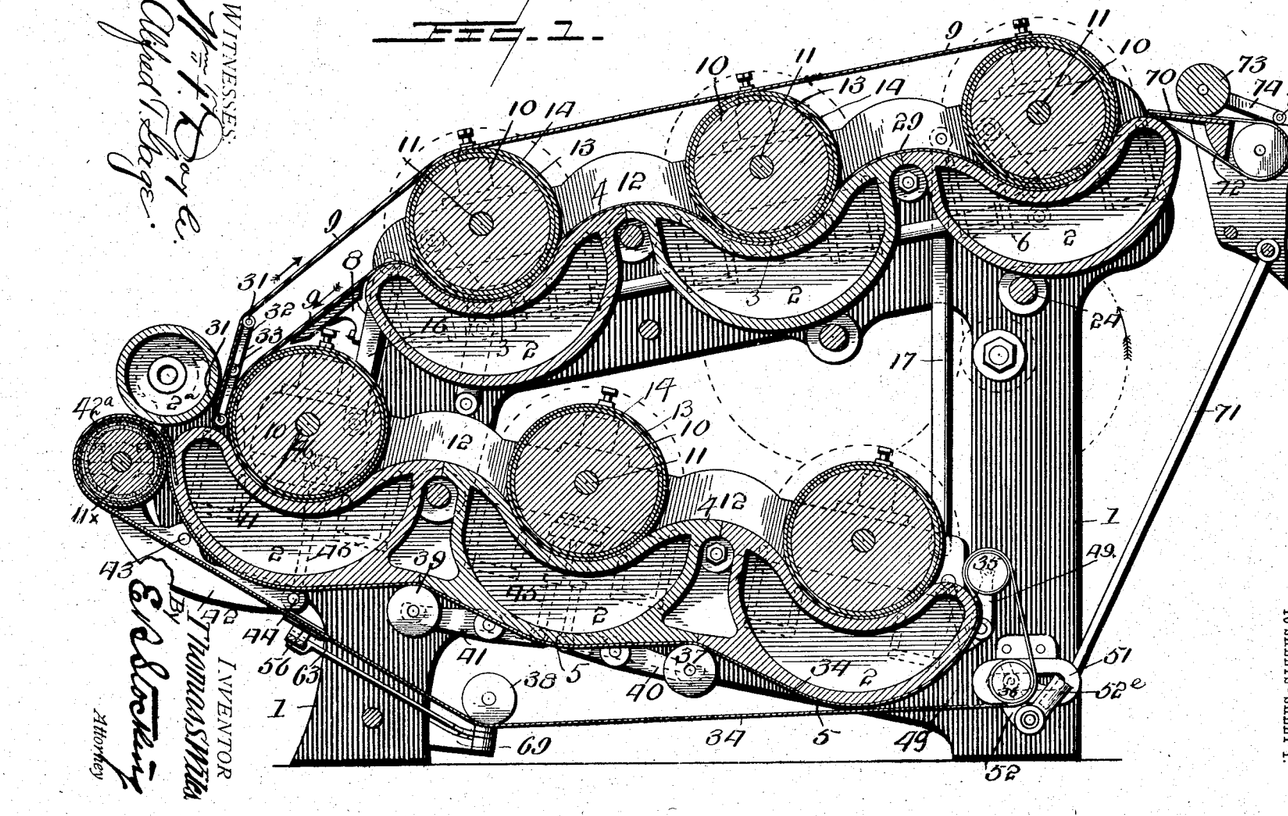
Figure 1 is a central longitudinal vertical section of an ironing-machine or mangle constructed in accordance with my invention, a portion of the feeding-table being broken away.

The clothed members which coöperate with the steam-chests are each a roll 10, Fig. 1, mounted upon the shaft 11, which in turn is mounted upon a frame 12, comprising two beams, one at each side of the machine, and proper connections therefor. Each of the rolls comprises suitable clothing well known in the art and herein illustrated as a number of plies of woolen fabric 13, covered by a suitable number of plies of cotton or other desired fabric 14. Adjustable spring-pressure housings 15, Fig. 3, are provided for all of the rolls. Similar rolls are provided to coöperate with the upper surfaces of the upper and lower series of steam-chests, and frames 12 serve for their support and operation. The upper frame 12 is connected to the lower frame 12 by links 16 17, so that when either of the frames is raised the other of said frames will also be raised, whereby a separation of the clothed rolls from the heated steam-chests is accomplished. In the form shown the connecting means between the two frames are links, and the means for lifting the frames effect that function by lifting the upper frame. It is understood that by "frame" is meant two beams or bars, one at each end of the clothed rolls and at each side of the machine. One specific means employed in this instance for lifting the frames comprises toggle-levers 18 19, Fig. 3, constituting one pair and 20 21 constituting another pair. The upper ends of the upper members of each of these pairs are pivotally connected with the upper frame 12 at 22 and 23, while the lower members of each of these pairs are pivotally connected with the frame 1, the member 18 at 24 and the member 20 at 25, as shown clearly in Fig. 3. It is understood that these toggle-levers are duplicated at each side of the machine. The rod 26 connects the members of the toggles at their central joints or points of articulation, and means for operating the toggles for the purpose of separating or bringing together the clothed and heated members of the ironing-machine may be connected in any desired manner. In order that lifting the ponderous weight of the parts to be operated by the toggles may be accomplished by the expenditure of a minimum force, the means adopted consists of a sector-gear 27, Fig. 2, secured firmly to the pivot 24 of the toggle 18, which is a shaft extending across the machine, and the lower member 18 of the opposite pair of toggles is mounted on the same shaft, whereby the duplicate members 18 upon the opposite sides of the machine are supported in alinement, and whereby, having rotatable bearings in the frame 1, both help to insure parallelism of the action of the toggles. Coöperating with the sector 27 is a worm 28, Fig. 2, meshing with teeth formed on the periphery of the sector. The worm is fixedly mounted upon a shaft 29, rotatably mounted in suitable bearings and provided with a hand-wheel 30, by which it may be operated. Whatever means are employed to operate the shaft 24 it is apparent that when the toggles are brought to a straight line both frames 12, with the clothed rolls and the gears mounted in said frames and meshing, as hereinafter described, will be elevated, respectively, from the upper and lower series of steam-chests.

As hereinbefore set forth, the under faces of the second or lower series of steam-chests present a continuous polished surface adapted to perform the function of ironing in connection with any suitable coöperating member or members. It is one of the objects of this invention after goods have been ironed by passing between the upper surfaces of both series of steam-chests and their coacting clothed rollers and after emerging from the second series at the feeding end of the machine to pass the goods back along and in close contact with the under surface of the chests of the second series, whereby they may be thoroughly dried. It is of course understood that the previously-operating ironing members have practically dried the goods before they reach the apron 34 by the evaporation taking place between each pair of said ironing members. Subsequently any remaining slight dampness in the goods is removed as they pass between the upper stretch of said apron and the lower surfaces of the lower series of steam-chests. It is apparent that the apron will absorb this slight moisture, so that its supporting and guiding rolls need not necessarily be clothed. To accomplish this, an endless apron 34 is provided. This apron is mounted on the rolls 35, 36, 37, 38, 39, and $11^{\times}$, the latter being a clothed roll arranged to coact with the heated ironing-roll $2^a$ as a final auxiliary pair of ironing members. Guiding-rolls 37 and 39 are mounted each in a pair of arms 40 41, pivoted so as to permit the rolls to coact with the lower ironing-surfaces 5 of the steam-chests of the lower series and at their under sides and so that said rolls and apron (when the clothed rolls 10 above each series of steam-chests are raised) will be lowered away from the under surface of the lower series of chests. In other words, in order to keep goods or articles being ironed in contact with the lower ironing-surfaces of the lower series of steam-chests the endless apron 34 is employed, and it is guided by any suitable rolls so disposed as to direct the apron into contact with the lower ironing-surfaces and to conduct the goods therealong to a point where they will be delivered from the machine to the action of any final ironing mechanism, such as a relatively inverted pair of ironing-rolls $2^a$ and $11^{\times}$. (Shown at the left of Fig. 1.) The roll $11^{\times}$ of such pair is mounted in bearings $42^a$ in arms 42, (shown in plan in Fig. 13,) pivotally supported, as at 43, connected by a pivot 44 with the link or rod 45 and with the lower frame 12 by said rod 45 at 46, a nut 47 and a spring 48 giving a yielding pressure to the arm 42 and between the rolls $11^{\times}$ and $2^a$, the latter being a heated roll of the usual construction. By this means of support and connection it will be seen that when the toggles 18 19 20 21 are straightened to separate the rolls from the steam-chests the clothed roll $11^{\times}$, coöperating with the heated roll $2^a$, will be moved from contact with the heated roll and from the steam-chest adjacent thereto, that being the first chest of the lower series. The heated roll $2^a$ is mounted in the main frame 1. The arms 40 and 41 are connected to similar links or rods 45, which in turn are connected yieldingly with the lower frame 12, whereby the apron 34 may be lowered, as shown by dotted lines in Fig. 3, when the frames 12 are elevated. The system of connection between the parts to be separated from the other elements is simple, direct, and powerful and controlled by means adapted to give the necessary movement with a minimum exertion on the part of the operator. When the rolls 10 are separated from the steam-chests, the endless apron 34 is adjusted in tension and moved to or from the lower end of the lower series of steam-chests by the following devices: The apron-guiding roll 35, at the front or feed end of the machine and adjacent to the end of the lower series of steam-chests, is carried by the longer arms of a pair of bell-crank levers 49, (there being one at each side of the machine,) mounted on any suitable pivotal supports 50 on the frame 1, the shorter arms of said levers being connected with the lower frame 12 by links 55, pivotally secured at $55^a$ to said shorter arms. By this manner of mounting and connection it will be seen that as the frame 12 is elevated the roll 35 and the apron 34 will be swung away from the steam-chests 2.

While there are many different forms of movable apron-supports and guiding devices that might be employed, the form just described seems to embody simplicity of construction and accuracy of operation and is therefore preferred.

The tension of the apron 34 may also be controlled by various devices; but the preferred means for that purpose comprises the following construction, (see Figs. 1, 3, and 17 to 20:) The journals $36^a$ of the apron-guiding roll 36 are projected into and movable in elongated bearings 51, secured in any desired manner to the frame adjacent to one of its tie-rods $1^a$. 52 represents a bell-crank lever which is rigidly mounted on the tube 53, which embraces the tie-rod $1^a$, so as to be capable of rotation thereon. There is a rock-arm $52^a$ at the opposite end of the tube 53, and it has a ratchet $52^b$, coöperating with a pawl $52^c$, mounted on the frame 1 and pressed by a spring $52^d$. The lever 52 comprises two arms, one slotted to embrace the journal $36^a$ and the other recessed, as at $52^e$, for the reception of a bar wherewith to operate the bell-crank lever 52, rock-arm $52^a$, and the tube to which they are secured for the purpose of adjusting the tension of the apron 34 in a manner quite apparent. When a desired outward movement of the roll 36 has thus been produced, it is held in an adjusted position by means of the pawl and ratchet above described, because the arm $52^a$, having the ratchet $52^b$, being fixedly mounted on the tube 53, must move, as does the lever 52, secured to the same tube, and the pawl $52^c$ acts as a detent to maintain the roll 36 in an adjusted position.

Apron-directing means are employed to correct deviations from a straight path, which occur in aprons from several causes. Such means comprise edge-contacting plates 56, (see Figs. 3, 9, 10, and 11,) each of which, there being one at each side of the apron, consists of a grooved plate having a depending lug 57, slotted at 58 for adjustable connection by a bolt 59 to a bracket 60, secured to a cross-bar 61, extending across the apron and mounted by a pivot 62 on or carried by an arm 63, which carries a bearing 64 for one end of the guide and directing roll 38, Figs. 3 and 1. This bearing is a half-circle or yoke for facilitating the introduction of the roll 38 and has points 65 66, the latter being a pointed bolt to hold the journal-box 67 of the roll 38 and at the same time permit partial rotation of the bearing about said points when the arm 63 is moved about its pivot $63^a$, the bearing 64 being formed or mounted on an arm 68, (see Fig. 12,) projecting from the arm 63. A bracket 69, secured to the frame 1, serves to support the arm 63 at its pivot. These devices are duplicated at each side of the machine, so that a deviation of the apron 34 from a straight path moves the edge plate contacted by the apron, and this in turn swings the arms 63 and 68 so as to change the angularity of the guiding and directing roll 38 upon the apron in such a manner as to correct said deviation, and this, as it may be, at either side of the desired direct path.

Figure 2:
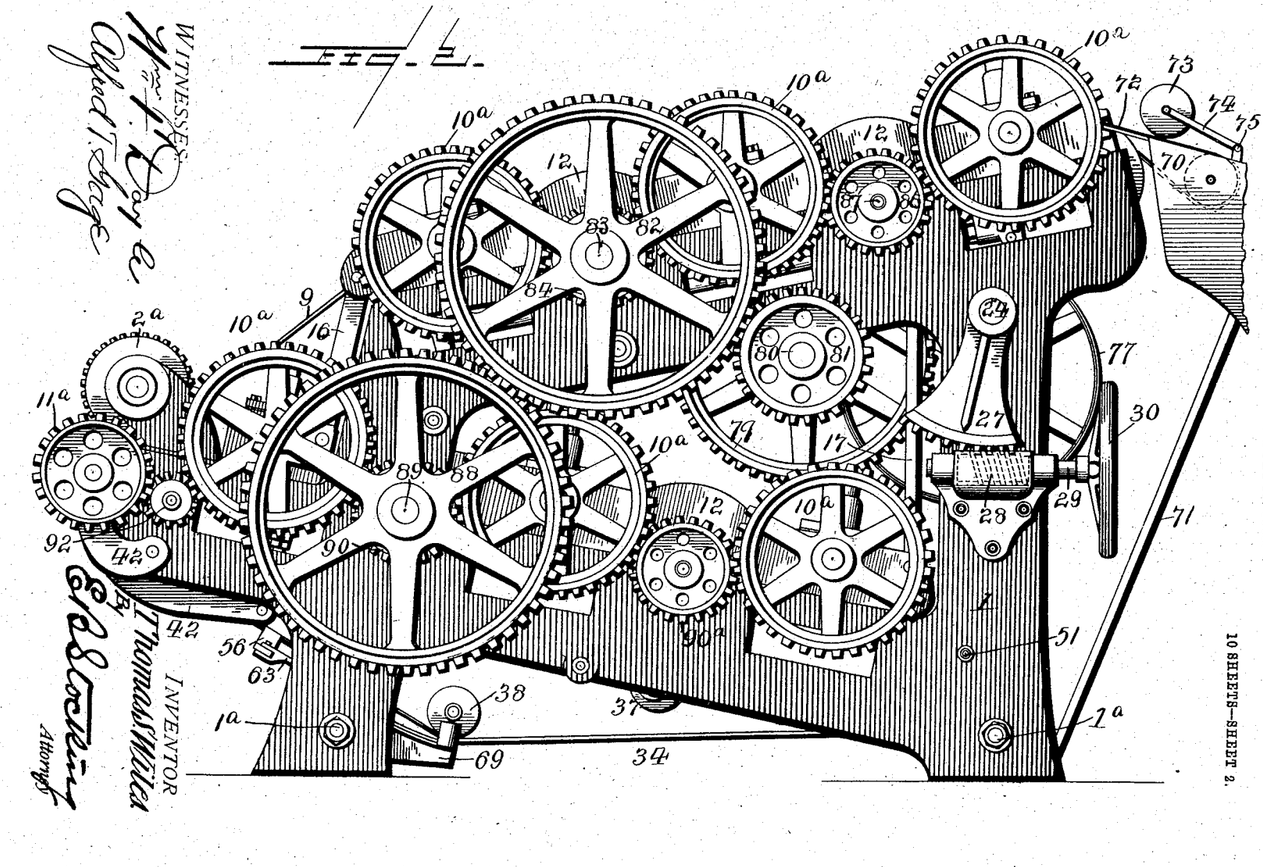
Fig. 2 is a left side elevation.

70, Figs. 1 and 2, is a feed-table connected to the frame 1 in any desired manner, supported by brace-rods 71, and provided with an endless apron 72 and presser-roll 73, mounted by links 74, pivoted at 75 to the table, as customary in the art.

Figures 4, 5:
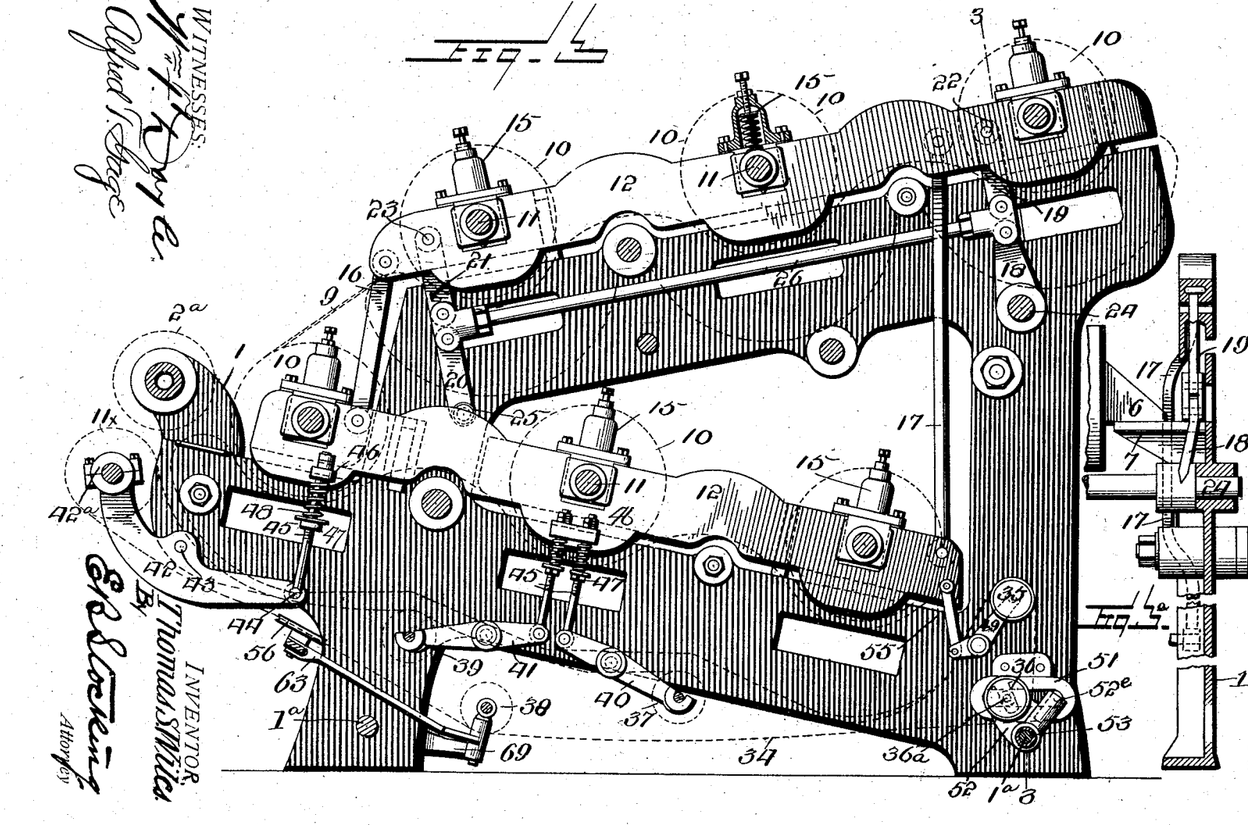
Fig. 4 is a plan of an end portion of the upper series of ironing members and of the gearing on the right side of the machine.
Fig. 5 is a right side elevation.
Figure 4:
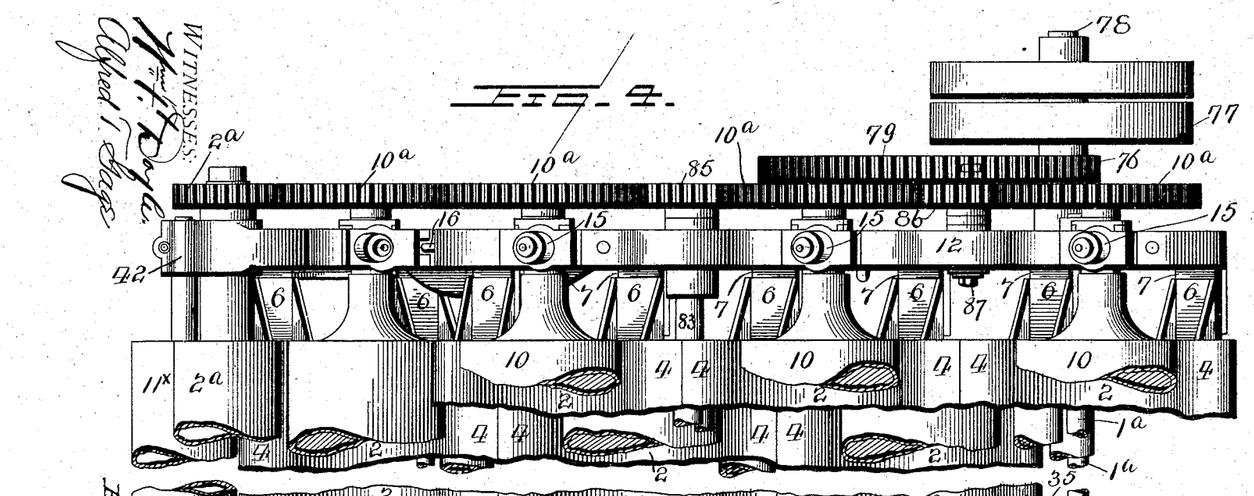
Figure 4A:
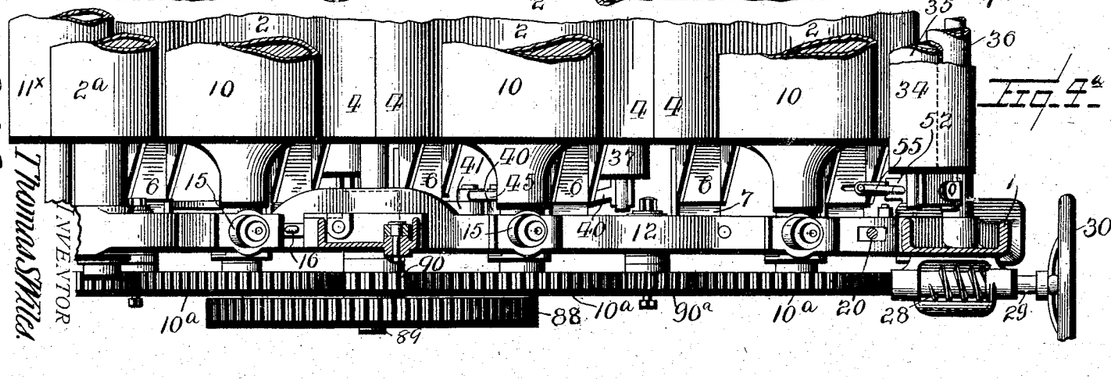
Figure 5:
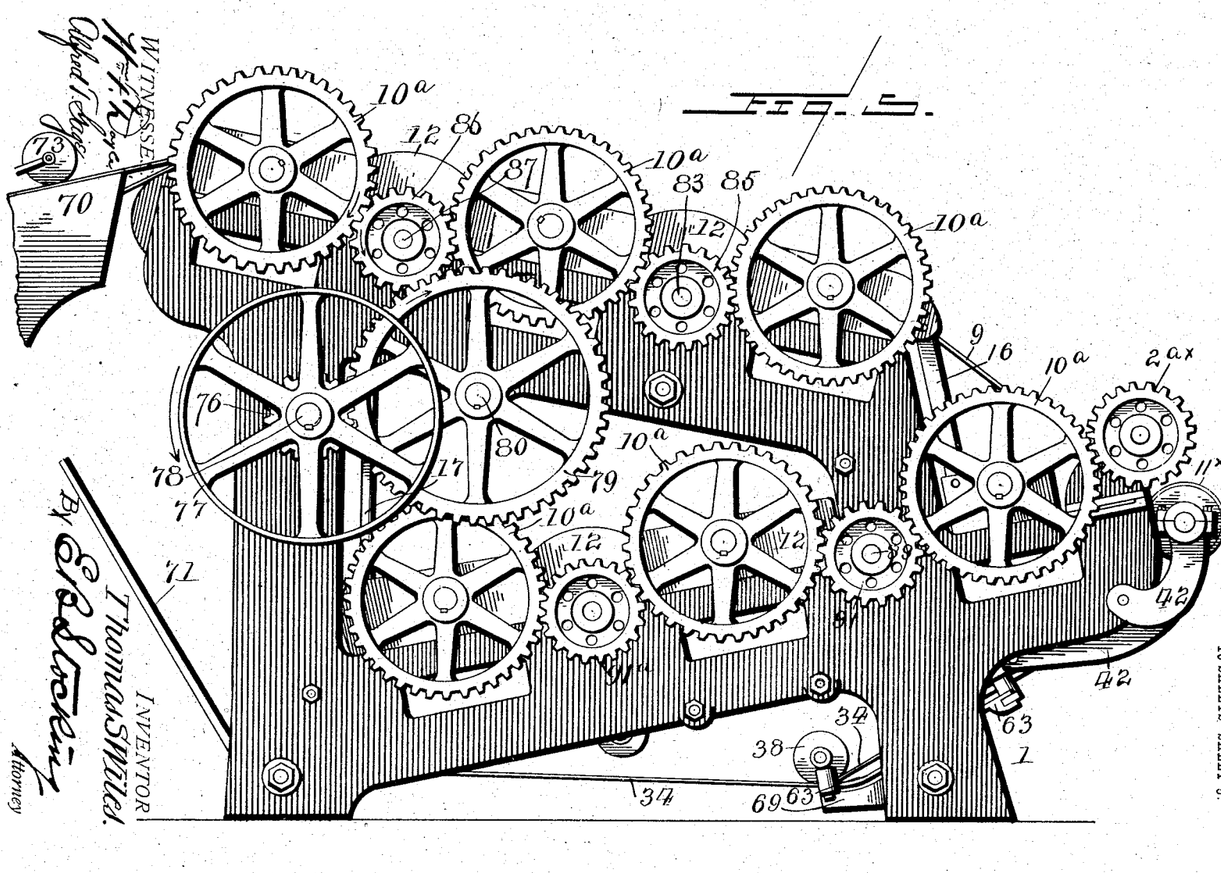
Figure 6:
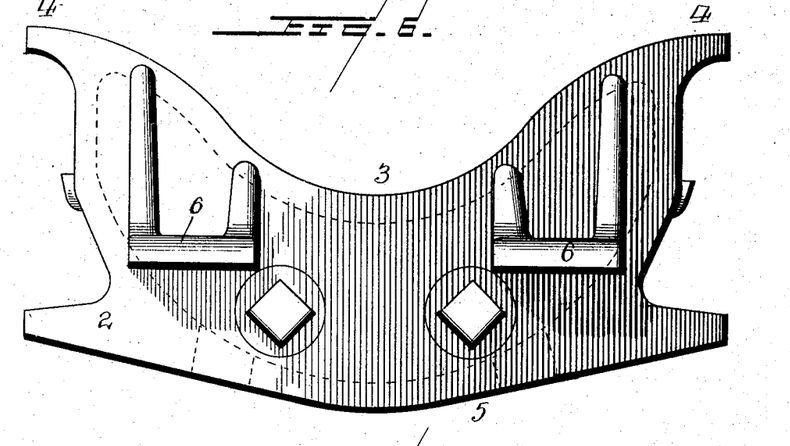
Fig. 6 is an end elevation.
Figures 7, 8:
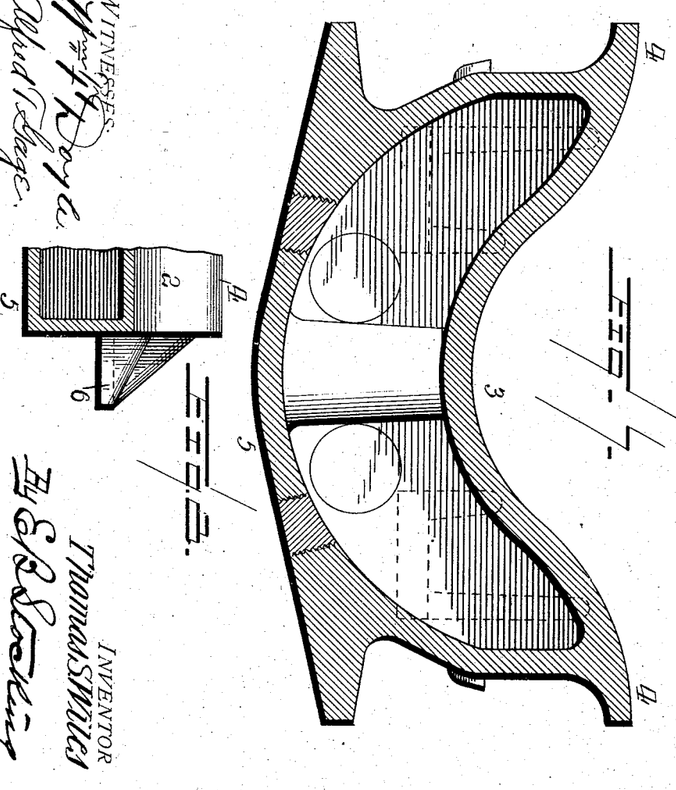
Figures 9, 10:
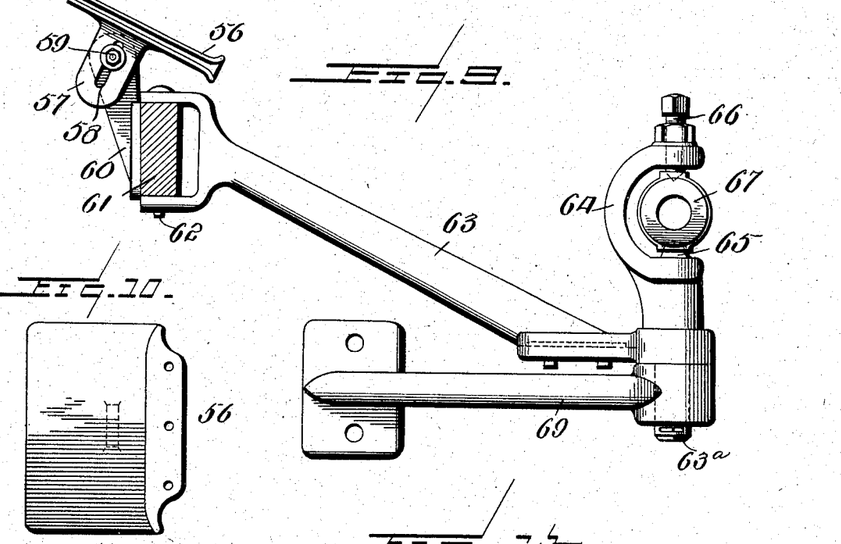
Fig. 9 is a side elevation of the apron-guiding mechanism.
Figs. 10 and 11 are a plan and a vertical section, respectively, of the contact-plate shown in Fig. 9.

Referring to Figs. 2, 4, $4^a$, and 14, the system of gearing adopted in this instance will be understood. Any other system of gearing may be substituted in accordance with the wish of the constructor. Taking the feed end of the machine as the front of the machine, the right side is that at which the driving-pulley is located. Figs. 4 and 5 show the gearing on the right side and Figs. 2, $4^a$, and 14 the gearing on the left side. Beginning with the driving-pinion 76, attached to the driving-pulley 77, mounted on the stud 78 on the right side of the machine, as shown in Fig. 5, it drives the gear-wheel 79, which is keyed on the shaft 80, running through the machine, which carries on its other end on the left side of the machine a gear-wheel 81, which drives a gear-wheel 82, which is keyed to a shaft 83, running through the machine, which carries a gear-wheel 84 on the left and 85 on the right, which act as intermediates between the gear-wheels $10^a$ of the second and third clothed rolls 10 of the upper series and actuate said series, the intermediates 86 between the second and first clothed rolls of the series being mounted on studs 87, attached to the frames 12 on either side and driven from the second gears $10^a$ of the upper series. The lower or second series of clothed rolls 10 is actuated in a like manner through a second gear-wheel 88, meshing with the wheel 82 at the left and disposed on a shaft 89, running through the machine and carrying a pair of intermediates 90 and 91 upon the left and right sides, respectively, between the first and second clothed rolls 10 of the second series. The third wheel $10^a$ of the lower series at the left, Fig. 2, is driven from the second wheel by an intermediate $90^a$, mounted on a stub-shaft, while the third wheel at the right is similarly driven by an intermediate $91^a$.

Figures 11, 12, 13, 14:
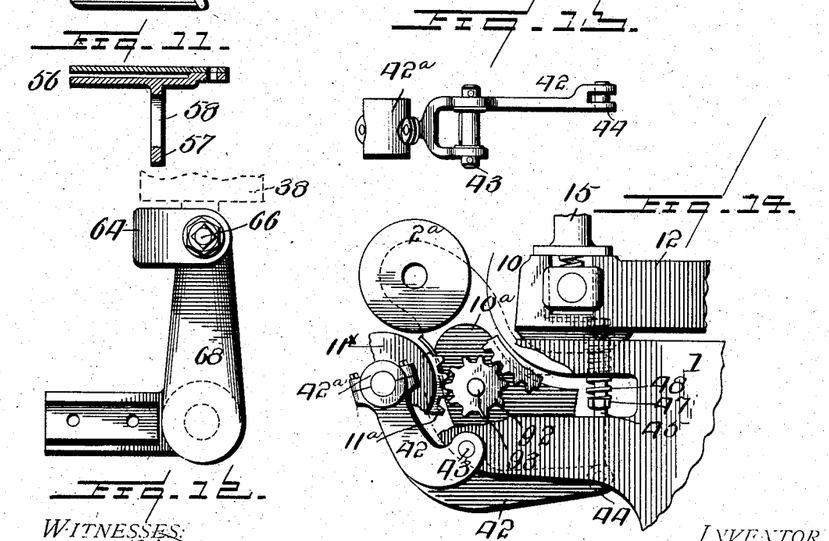
Fig. 12 is a plan of a bearing-arm shown in Fig. 9.
Fig. 13 is a plan of a lever shown in Fig. 14.
Fig. 14 is a side elevation, on an enlarged scale, of the delivery end of the machine.

The clothed roll $11^x$ at the delivery end of the machine (see Figs. 1, 2, and 14) pulls the apron 34 (over and around which the apron passes in returning to the other end of the machine) and also serves as the lower member of a pair of finishing or final ironing rolls $2^a$ and $11^x$ and is shown with gear $11^a$ as being driven by the gear-wheel $10^a$ of the first clothed roll 10 of the lower series through an intermediate 92, mounted on a fixed stud and having teeth of a depth to permit the separation of the rolls $2^a$ and $11^x$ without unmeshing, as shown in Fig. 14. A gear $2^{ax}$ drives the heated roll $2^a$ by meshing with the adjacent first clothed-roll gear $10^a$, as shown at the right of Fig. 5.

It is apparent that many changes in details of construction and devices for separating the clothed members from the heated members may be made without departing from the principle and general mode of operation of my invention. So, also, clothed rolls with any desired conveying means may be used to coact with the lower finished surfaces of the lower or second series of steam-chests. Some of the variations in such and similar features are clearly shown in Figs. 15 and 16.

Figure 15:
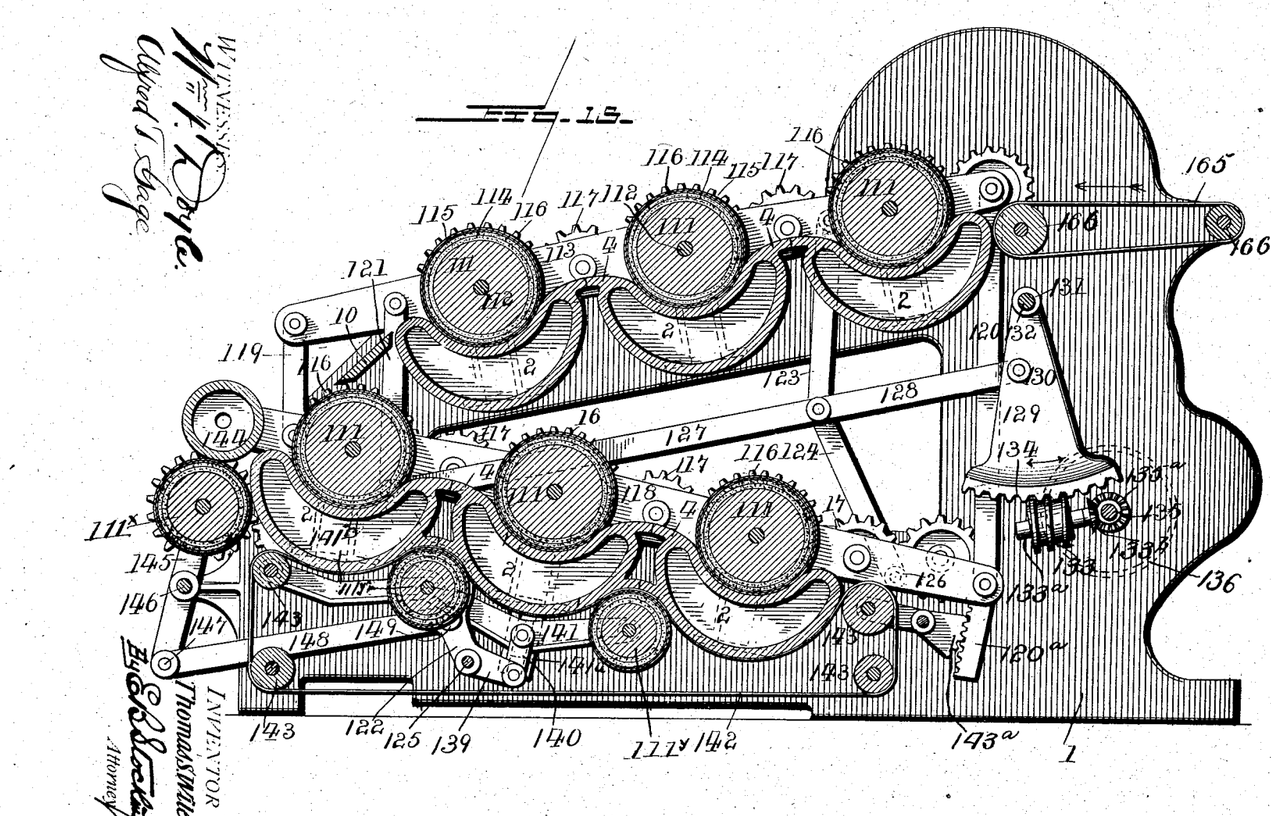
Figs. 15 and 16 illustrate certain modifications hereinafter to be described.

In Fig. 15, 1 is a frame having steam-chests 2 mounted therein, and clothed rollers 111 mounted in frames 113 and 118, the former above the upper series of steam-chests and the latter above the lower or second series of steam-chests, said frames being connected with each other by the links 119 and 120. Toggles 121, 122, 123, and 124 serve to lift the frames. The members 121 and 123 are pivotally connected with the upper frame 113, while the members 122 and 124 are pivoted to the main frame at 125 and 126, respectively. The rod or bar 127 connects the toggles at their points of articulation and has an extension 128, pivotally connected at 130 with the gear-sector 129, which at its upper end 131 is pivoted, as at 132, to the frame 1. Gear-teeth 134 on the sector mesh with the worm 133, mounted on the shaft $133^a$, bearing the miter-gear $133^b$, which meshes with a similar gear $135^a$, mounted on the cross-shaft 135, so that by a duplication of these parts and connections a rotation of the shaft by the hand-wheel 136 (shown by dotted lines) causes the desired operation of the toggles to lift the frames and the clothed members from the steam-chests beneath the same. The clothed rollers 111 are mounted upon the shafts 112, taking bearings in the frames, and the clothing comprises a woolen body-cover 114, covered by any suitable textile fabric 115, and each of the rollers is provided with a gear 116, that intermeshes with the intermediates 117. In this modification the means for raising the rolls 111 and for lowering the apron 142 comprise a yoke 141, guided by ribs $141^a$, similar to the ribs 173 in the frame 1, and having an extension $141^b$, and in this yoke are mounted rolls $111^y$ and one of the apron-guiding rolls 143, as clearly shown. The upper roll 143, carrying the apron at the front end of the machine, is mounted in pivoted arms, one of which, at least, is extended in the form of a toothed sector, as shown at $143^a$, which sector meshes with a toothed rack formed on an extension $120^a$ of the link 120, whereby when the rolls 111 are raised the apron 142 is lowered at that end from the adjacent steam-chest. It will be recalled that the member 122 of one of the toggles is pivoted at 125 in the frame 1. Said member is extended beyond its pivot, as at 139, and connected with the yoke 141 by the link 140, so that when said toggle 121 122 is drawn up by the bar 127 into a straight line its extension moves downwardly and carries with it the yoke 141 and the rollers carried therein, whereby the apron and rollers $111^y$ are moved downwardly away from the lower ironing-surfaces of the lower series of steam-chests. When the final ironing members 144 and $111^x$ are employed, they are separated simultaneously by means of the link 148, pivotally connected to the lower member 122 of the toggle above its pivot 125, so that when said toggle is moved a practically longitudinal movement of the link 148 is produced, and by mounting the clothed roller $111^x$ in the arm 145, pivoted to the bracket on the frame 1 at 146, and having its pivotal connection with the link 148 at 147, said clothed roller is swung outwardly away from the adjacent steam-chest 2, and by the elevation of the frame 118, in which the heated member 144 of the final pair is mounted, it follows that the heated member is also raised, whereby the separation of the final ironing members of the machine is produced simultaneously with the separation of the clothed rollers from the steam-chests thereof.

Figure 16:
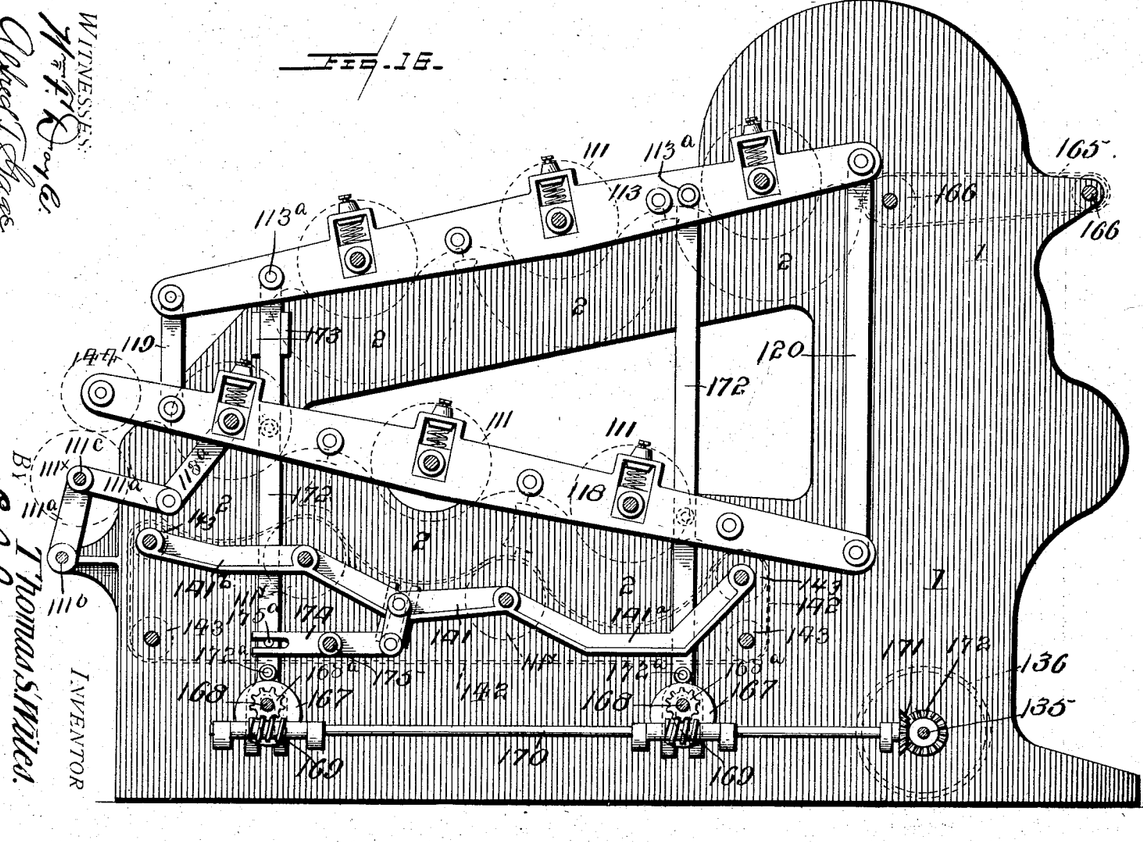
Figure 17:
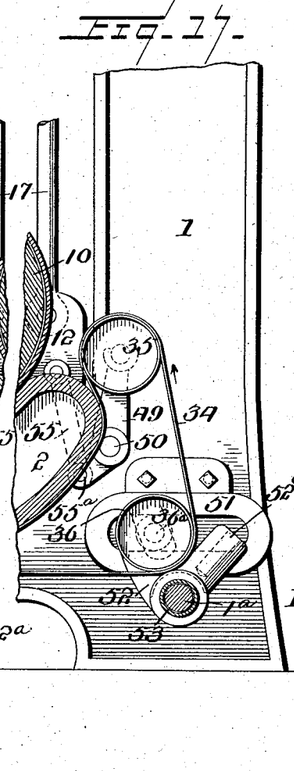
Fig. 17 is a detail in elevation, with parts in section, of the apron guiding and controlling means.
Figure 18:
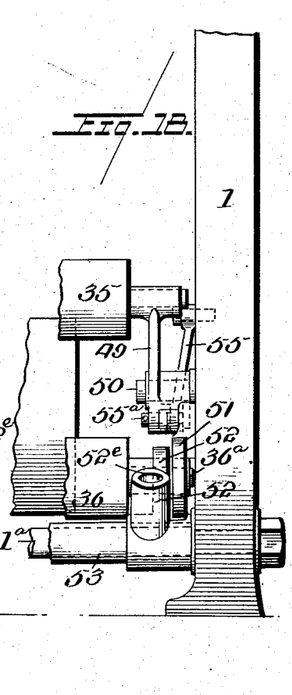
Fig. 18 is an elevation of the parts shown in Fig. 17.
Figures 19, 20:
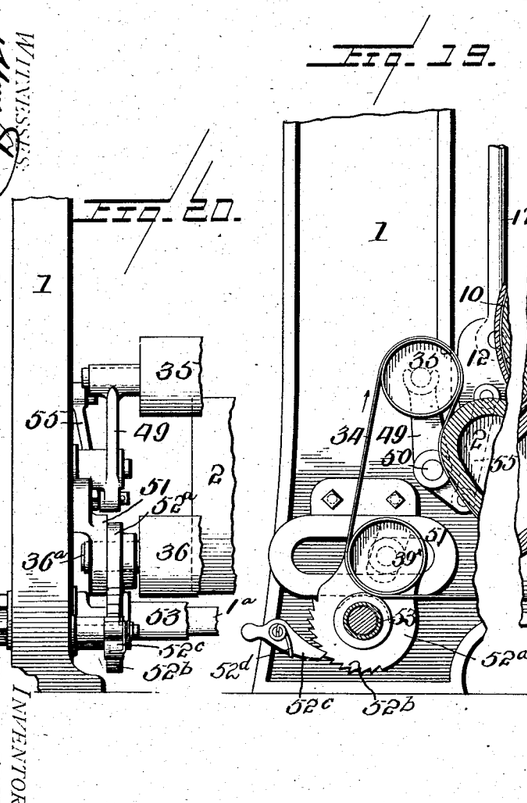
Fig. 19 is a detail in elevation, with parts in section, of the apron-tension device.
Fig. 20 is an elevation of the parts which are shown in Fig. 19.

Still another form of devices may be employed for producing the movement of the ironing elements to cause the separation of the same, as illustrated in Fig. 16. This figure also illustrates a different arrangement of the feeding devices, wherein the endless feeding-apron 165 is mounted upon the rollers 166, taking bearing in the frame 1 of the machine instead of any additional structure or table, as hereinbefore described. Referring to the devices for lifting and depressing the clothed members of the ironing devices, it will be seen that the frames 113 and 118, carrying the clothed members 111, (similar to those shown in Fig. 15,) are connected by links 119 and 120 and that standards 172, mounted for reciprocation, one being shown as guided by or in ribs 173, are connected with the upper frame at $113^a$ and that at their lower ends they are bifurcated, so as to embrace each one a transverse shaft 168, carrying the cams 167 and the gears $168^a$ at the opposite sides of the machine. The worms 169 are mounted upon the longitudinal shaft 170, that terminates in a beveled gear 171, which meshes with a similar gear 172, mounted upon the transverse shaft 135 and provided with a hand-wheel 136, whereby rotation of the wheel causes the cams 167 to rotate and, contacting with the antifriction-roller $172^a$ on the standards 172, thereby serve to lift the frames and members carried thereby and to operate the members mechanically connected therewith. It is understood that the standards 172 are duplicated at the opposite side of the machine from that shown. The yoke 141, carrying the clothed rollers $111^y$, and by the arms $141^a$ and $141^b$, carrying the endless apron or tapes 142, (shown in dotted lines,) together with their upper guiding-rollers 143, are raised and lowered by means of the lever 174, pivoted at 175 in the frame 1 and connected by the open-slot construction $175^a$ with one pair of the standards 172, so that as the standards rise to lift the frames the yoke 141 is drawn downwardly, so as to lower the clothed rollers or apron from the finished surfaces of the lower series of steam-chests. The lower rollers 143 in Figs. 15 and 16 are rotatably mounted in the frame 1. In a like manner the heated member 144 and clothed member $111^x$ of the final ironing members of the machine are separated from each other by connection with the lower frame 118 through the medium of the bell-crank lever 111ª, pivoted at 111ᵇ to the frame 1, the roller 111ˣ being journaled at the intersecting point of the arms of said bell-crank lever, as at 111ᶜ. This bell-crank lever is connected by the link 118ª with the frame 118, so that when said frame is raised the ironing member 144, carried thereby, is raised with it and the ironing member 111ˣ, carried by the bell-crank lever, is swung outwardly away from the steam-chest 2, whereby all the clothed surfaces are separated from the heated ironing-surfaces.

Various other modifications may be made in the devices for separating the clothed and heated members of the machine and permitting the accomplishment of this result by the expenditure of a minimum amount of force by the operator and at the same time adapted to a machine of longitudinally-restricted dimensions while possessing the required heating and evaporating surfaces and desired limited clothed surfaces contacting with said heated surfaces. So, also, different specific separating means may be employed to separate the relatively inverted finishing ironing members of the machine simultaneously with the separation of the clothed rolls from the steam-chests.

By the term "relatively inverted" when referring to the heated and clothed members of the machine it is to be understood that in the final succession of pairs of such members the heated member of one pair is arranged above and that of the other pair below its coacting clothed member. For example, in the present illustration (see Fig. 1) the final ironing members 2ª and 11ˣ are arranged with the heated member 2ª above the clothed member 11ˣ, while in the preceding pair the heated member 2 is arranged below the clothed member 10, and said pairs are therefore relatively inverted.

Having described my invention and set forth its merits, what I claim, and desire to secure by Letters Patent, is—

1. The combination with a plurality of series of fixed steam-chests, of a coöperating plurality of series of relatively movable clothed rolls, and means for simultaneously and positively separating the rolls from each series of the steam-chests.

2. The combination of two oppositely-inclined series of steam-chests, of two oppositely-inclined series of clothed rolls, and means for separating the rolls from the chests.

3. The combination of a plurality of steam-heated ironing-surfaces, a plurality of coacting clothed members, said surfaces and members being arranged in series, each series being disposed in a relatively different inclined plane, with means for simultaneously separating the ironing-surfaces and clothed members from each other.

4. The combination of two series of fixed steam-chests arranged one above the other, a series of clothed members coöperatively arranged with each series of steam-chests, and means for simultaneously and positively separating said clothed members from said chests.

5. The combination of two series of steam-chests one of which is finished or provided with ironing-surfaces upon the opposite faces thereof, with three series of coacting ironing members and with means for simultaneously separating said ironing members from said steam-chests.

6. The combination of two series of steam-chests one of which is finished upon the opposite faces thereof, and three series of clothed rolls arranged to coöperate with said steam-chests, and means for simultaneously separating the rolls from the chests.

7. The combination of two series of stationary heated ironing members arranged one above the other, three series of coacting clothed ironing members, and means for simultaneously separating said clothed members from the heated members.

8. The combination of two series of stationary heated ironing members, two series of clothed members adapted to coöperate with said stationary heated ironing members, and means comprising non-resilient connections for simultaneously and positively separating the clothed and the heated members from each other.

9. The combination of two series of fixed heated ironing members having continuously undulatory upper ironing-surfaces, the one being arranged above and projecting beyond the other, in combination with two series of rotary clothed ironing members, and means for simultaneously and positively separating the clothed members from the heated members.

10. The combination of two series of fixed heated ironing members each series having a continuous ironing-surface and each arranged in a different inclined plane and projecting beyond the other, with two series of rotary clothed ironing members, and means for simultaneously separating the clothed members from the heated members.

11. The combination of two series of fixed heated ironing members each series having a continuous ironing-surface and each arranged in a different inclined plane and projecting beyond the other, with two series of rotary clothed rollers, and means for conducting or directing goods from one series of fixed ironing members to the other.

12. The combination with two series of fixed heated ironing members, and with two coöperating series of clothed members, of frames, one for carrying each series of clothed members, and means for lifting and depressing the frames.

13. The combination with two series of fixed heated ironing members, and with two coöp- erating series of clothed members, of frames, one for each series of clothed members, means for connecting the frames to each other, and means for raising and lowering one of the frames.

14. The combination with two series of fixed heated ironing members, and with two coöperating series of clothed members, of connected frames one for each series of clothed members, and toggles for raising and lowering the upper frame.

15. The combination of two series of fixed heated ironing members, and with two coöperating series of clothed members, of frames, one for each series of clothed members, means for connecting the frames to each other, and independent means for raising and lowering the upper frame.

16. The combination with two series of fixed heated ironing members, and with two series of clothed members, of connected frames one for carrying each series of clothed members, toggles for raising and lowering one of the frames and means for operating the toggles.

17. The combination with two series of fixed heated ironing members, and with two coöperative series of clothed members, of connected frames one for each series of clothed members, toggles for raising and lowering one of the frames, and a geared sector for operating the toggles.

18. The combination with two series of steam-chests one of which is finished upon both faces, with two series of clothed rolls, an apron arranged to coöperate with the lower surface of the second series of steam-chests, and means for separating the several series of clothed rolls and the apron from the chests.

19. The combination of two series of steam-chests one of which series is finished upon its upper and lower surfaces, two series of clothed rolls arranged to coöperate with the upper surfaces of the steam-chests, an apron arranged to coöperate with the lower surface of the lower series, and means for raising the series of rolls coöperating with the upper surfaces of the steam-chests and for lowering the apron which coöperates with the lower finished surfaces of the steam-chests for the purpose of separating the rolls and apron from the chests.

20. The combination with two series of steam-chests and with two series of clothed rolls adapted to coöperate therewith, of movable frames for supporting said rolls, links for connecting said frames, and means connected with one of said frames for the purpose of separating the rolls from the steam-chests.

21. The combination with two series of steam-chests and with two series of clothed rolls adapted to coöperate therewith, of movable frames for supporting said rolls, links for connecting said frames, and frame-lifting means having one end connected with one of the frames and the other end pivotally mounted on the main frame of the machine.

22. The combination with two series of steam-chests and with two series of clothed rolls adapted to coöperate therewith, of movable frames for supporting said rolls, links for connecting said frames, frame-lifting means having one end connected with one of said frames and the other end pivotally mounted on the main frame of the machine, and devices for operating said frame-lifting means.

23. The combination with two series of steam-chests, two series of clothed rolls each adapted to coöperate with one of said series of steam-chests, frames for supporting said rolls, means for connecting the frame of one of the series of rolls with that of the other series, means for lifting and depressing the upper of said frames, and devices for operating said lifting means.

24. The combination with two series of steam-chests, of three series of clothed rolls adapted to coöperate therewith, frames for supporting said rolls, means for separating two series of said rolls from the upper surface of said steam-chests, and means for separating the rolls coöperating with a lower surface of one of said series of steam-chests.

25. The combination with two series of steam-chests, of two series of clothed rolls coöperating with the upper surfaces of said steam-chests, and of a series of rolls coöperating with the lower surface of one of said series of steam-chests, and lifting and lowering means coöperating with the supporting means of said rolls and operating to separate the same from the steam-chests by raising the rolls above and lowering the rolls below the steam-chests.

26. The combination of two oppositely-inclined series of steam-chests, two series of ironing-rolls coöperating therewith, and a relatively inverted pair of ironing members.

27. The combination of two series of steam-chests, two series of ironing-rolls coöperating therewith, a relatively inverted pair of ironing members, means for separating the clothed rolls from the steam-chests, and connected means for separating the relatively inverted ironing member from its coöperating clothed member.

28. The combination of two inclined series of steam chests and rolls, means for conducting articles from the lower end of one inclined series to the upper end of the other inclined series, an endless apron and clothed rolls arranged to coöperate with the under surface of the lower series of steam-chests, and means for separating the endless apron and clothed rolls from the under surface of said lower series of steam-chests.

29. The combination of two oppositely-inclined series of steam-chests and two series of clothed rolls adapted to coöperate with the upper surfaces of said steam-chests, an endless apron and a series of clothed rolls adapted to coöperate with the lower surface of the lower one of said series of steam-chests, a relatively inverted pair of ironing members arranged at the elevated end of the latter series of steam-chests, and means for separating all the clothed members from the heated members of the machine.

30. The combination with two series of steam-chests, two series of clothed rolls adapted to coöperate therewith, frames for supporting said rolls, means for moving said frames for separating said rolls from said chests, and a relatively inverted pair of ironing members one of which is mounted on the support of the clothed rolls that are arranged to coöperate with one series of the steam-chests.

31. The combination with two series of steam-chests, one series having upper and lower finished surfaces, three series of clothed rolls, and a relatively inverted pair of ironing members one of which is mounted on the support for one series of clothed rolls, and the other of which is mounted in a movable frame operatively connected with the main frame.

32. The combination with a series of stationary heated ironing members, of a series of rotary clothed members, a movable frame supporting said clothed members, toggles connected with said frame near each end thereof, a bar connecting said toggles, a pivoted lever connected with said bar, a geared sector upon said lever, and a driving-worm engaging said sector.

33. The combination with a series of stationary heated ironing members, of a series of rotary clothed members, a movable frame supporting said clothed members, toggles connected with said frame near each end thereof, a bar connecting said toggles, a pivoted lever connected with said bar, a geared sector upon said lever, a driving-worm engaging said sector, a shaft connected with said worm, and a hand-wheel carried by said shaft.

34. The combination with a series of stationary heated ironing members, of a series of rotary clothed members, a movable frame supporting said clothed members, toggles connected with said frame near each end thereof, a bar connecting said toggles, means for operating said bar whereby said clothed members recede and their supporting-frame may be raised and lowered in parallelism with said heated members, and final ironing-rolls one of which is mounted in a pivoted support connected with the supporting-frame of the clothed members.

35. The combination with a series of stationary heated ironing members, of a series of rotary clothed members, a movable frame supporting said clothed members, toggles connected with said frame near each end thereof, a bar connecting said toggles, means for operating said bar whereby said clothed members and their supporting-frame may be raised and lowered in parallelism with said heated members, final ironing-rolls one of which is mounted in a pivoted support, and means for connecting said pivoted support to a part moving with the raising and lowering toggles of the clothed rolls.

36. The combination of a series of clothed rolls, a movable frame for supporting the same, a series of fixed heated ironing members, a final heated roller, a coöperating final clothed ironing-roller mounted in pivoted arms, toggles at the opposite ends of the movable frame, a connection extending from one of said arms to a toggle, a connecting-bar between said toggles, a geared sector and worm for operating said bar, and means for driving said worm.

37. The combination with a series of fixed steam-chests, of a series of clothed members coöperating therewith, a movable supporting-frame for said clothed members, a pair of final ironing-rolls at the delivery end of the clothed rolls, means for mounting one of said final rolls for movement away from the other, and a connection between said movable final ironing-roll and said movable frame to effect a simultaneous separation of the final rolls with the separation of the said clothed members and chests.

In testimony whereof I affix my signature in presence of two witnesses.

THOMAS S. WILES.

Witnesses:
JOHN W. SWEENEY,
HARRY B. AGARS.